United States Patent [19]

Horstman

[11] Patent Number: 4,819,548

[45] Date of Patent: Apr. 11, 1989

[54] DUAL NOZZLE CABIN VENTILATION SYSTEM

[75] Inventor: Raymond H. Horstman, Auburn, Wash.

[73] Assignee: The Boeing Company, Seattle, Wash.

[21] Appl. No.: 46,631

[22] Filed: May 7, 1987

[51] Int. Cl.⁴ .............................................. B60H 1/24
[52] U.S. Cl. .................................... 98/1; 98/1.5; 98/14; 98/40.01; 98/40.18; 244/118.5
[58] Field of Search ............... 98/1, 1.5, 2.15, 5, 98/10, 14, 40.01, 40.03, 40.1, 40.14, 40.18, 40.19; 244/118.5

[56] References Cited

U.S. PATENT DOCUMENTS

| | | | |
|---|---|---|---|
| 2,264,637 | 12/1941 | Landell | 98/10 X |
| 2,395,233 | 2/1946 | Richardson | 98/40.03 |
| 2,702,986 | 3/1955 | Kadosch et al. | 239/DIG. 7 X |
| 2,775,186 | 12/1956 | Strobell | 98/14 |
| 2,794,383 | 6/1957 | Reynolds | 98/40.19 X |
| 2,799,213 | 7/1957 | Hansen | 98/40.03 |
| 2,848,434 | 8/1958 | Allander | 98/40.1 |
| 3,726,204 | 4/1973 | Lindeström | 98/40.18 X |
| 3,777,648 | 12/1973 | McGowan et al. | 98/14 X |
| 4,109,563 | 8/1978 | Schleicher | 98/40.01 X |
| 4,266,722 | 5/1981 | Nawa et al. | 239/DIG. 7 X |
| 4,326,452 | 4/1982 | Nawa et al. | 236/49 X |
| 4,327,869 | 5/1982 | Nawa et al. | 239/DIG. 7 X |
| 4,556,172 | 12/1985 | Sugawara et al. | 239/DIG. 7 X |

FOREIGN PATENT DOCUMENTS

| | | | |
|---|---|---|---|
| 54-68033 | 5/1979 | Japan . | |
| 165438 | 12/1980 | Japan | 98/40.01 |
| 7901143 | 8/1979 | Netherlands | 98/40.18 |

Primary Examiner—Harold Joyce
Attorney, Agent, or Firm—Christensen, O'Connor, Johnson & Kindness

[57] ABSTRACT

A supply air ventilation system for providing symmetrical airflow distribution in the cabin of an aircraft, while avoiding excessive flow velocity. The ventilation system includes a supply duct (106) from which pressurized supply air is delivered through a first nozzle (118) at a relatively higher velocity and lower flow volume than through a second nozzle (110). Air flowing through the first nozzle attaches to a surface (132) of an overhead storage bin (16) that curves downwardly into the cabin (12) of the aircraft due to the Coanda Effect, and mixes with the lower velocity higher volume air flowing through the second nozzle, thereby carrying it downwardly into the aircraft cabin.

19 Claims, 3 Drawing Sheets

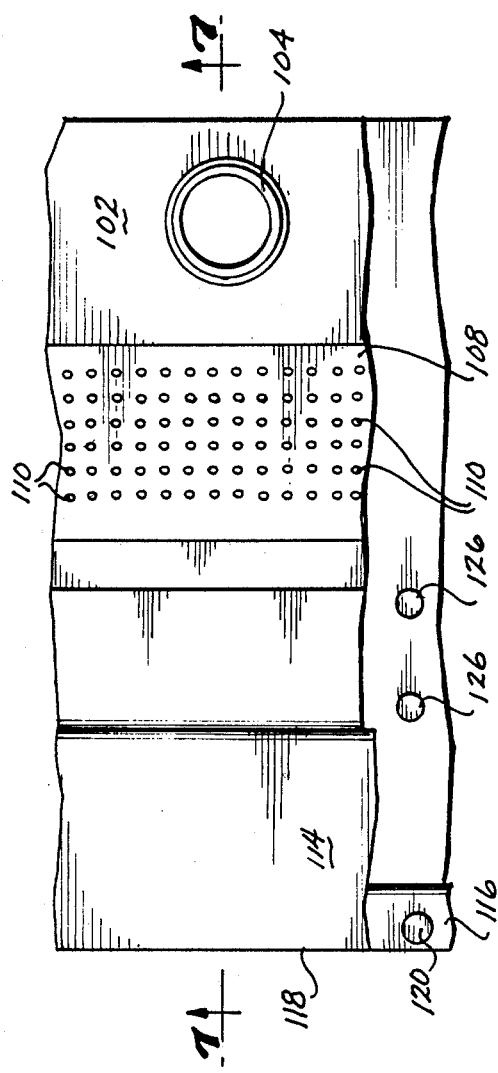
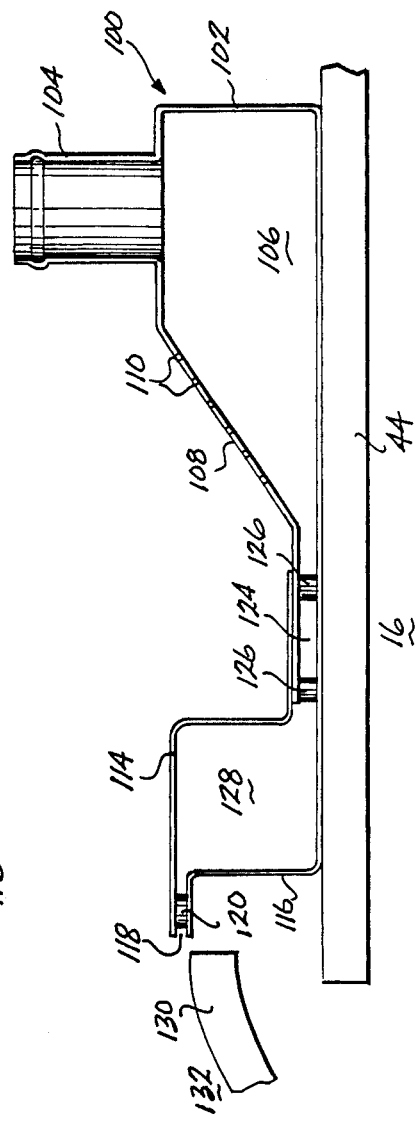

4,819,548

DUAL NOZZLE CABIN VENTILATION SYSTEM

TECHNICAL FIELD

This invention generally pertains to a ventilation system for an enclosed space and specifically to a nozzle arrangement wherein a fluid is ejected to flow into an enclosed space by attachment to an adjacent projecting surface.

BACKGROUND ART

The cabin of an aircraft flying relatively high altitudes must be sealed and supplied with pressurized ventilation air for the comfort of the passengers. The ventilation system of an aircraft thus typically includes one or more ducts through which pressurized and temperature conditioned supply air is conveyed into the cabin. Overhead nozzles, adjustable both in directional orientation and rate of airflow are provided in some such systems to give each passenger limited control over the ventilation and velocity of supply airflow in their immediate environs. Unfortunately, relatively high noise levels and drafty conditions objectionable to adjacent passengers often result when these nozzles are fully opened and oriented without regard to the comfort of adjacent passengers.

More recently, such individually adjustable nozzles have been eliminated from aircraft ventilation systems in favor of more diffuse ventilation airflow introduced through a diffuser duct centered along the cabin ceiling. A plurality of orifices in fluid communication with the interior of the duct convey pressurized supply air downwardly into the cabin space to provide ventilation. One drawback to the prior art diffused ventilation systems is that they do not permit smoke and other contaminants to be efficiently cleared from the cabin.

In attempting to achieve better smoke and contaminant control, a ventilation system has been developed for supplying pressurized air through discharge slots or orifices formed in a supply duct running along the length of the cabin, and disposed where the bin's upper surface meets the downwardly curved ceiling. A plurality of slots comprising the duct output nozzle are disposed immediately adjacent the top surface of the storage bin. For proper distribution, the velocity of air flowing through the slots must be sufficient to "attach" the flow to the upper surface of the storage bin so that it follows that surface down into the cabin, a physical phenomenon known as the "Coanda Effect". Ventilation air flowing down into the seating area along the top surface of the storage bin on each side of the cabin tends to distribute symmetrically about a line (or vertical plane) that extends along the longitudinal axis of the cabin.

If the flow of air from the supply duct is below the critical velocity necessary to attach the airflow to the upper surface of the storage bin, it has been observed that the air may instead flow along the ceiling toward the opposite side of the cabin, mixing with the flow from the supply duct at the other side, thereby producing a very asymmetric airflow distribution throughout the cabin. Poor airflow distribution symmetry has been generally an accepted drawback of prior art ventilation systems, because concerns related to efficiently clearing passenger-generated carbon dioxide and cigarette smoke from the cabin were not emphasized to the extent they now are.

Since symmetrical distribution of ventilation airflow can be achieved by increasing the velocity of the supply air through the nozzle, it would appear that his problem could be easily solved. However, it has been found that providing supply air through the discharge slots at sufficient velocity so that the airflow attaches to the upper surface of the storage bin, produces a symmetrical airflow distribution having an unacceptable velocity in the passenger seating area, i.e., the average passenger tends to complain that the cabin is "drafty" and thus uncomfortable. In this instance, the obvious solution fails to resolve the problem.

SUMMARY OF THE INVENTION

In consideration of the above-noted problem, the present invention is directed to providing a ventilation apparatus for distributing pressurized air into an enclosed space, e.g., into the cabin of an aircraft, in a symmetrical distribution, but without excessive velocity. The pressurized air is supplied through a duct that is disposed along a perimeter of the enclosed space, adjacent a surface associated with the space that extends inwardly from the perimeter. A flange disposed adjacent the surface defines a first nozzle in fluid communication with the supply duct, having an outlet through which the pressurized air flows into the space. A flow restriction is provided to control the airflow through the first nozzle outlet, while maintaining sufficient velocity so that the flow attaches to the adjacent surface, following it into the enclosed space.

A second nozzle, also in fluid communication with the pressurized air supply duct, has a plurality of outlets disposed adjacent the flange, through which pressurized air flows into the space. Flow control orifices are provided in sufficient number and size to restrict the flow of air from the second nozzle to a velocity substantially less than the velocity of the air exiting the first nozzle although providing a higher volume of flow. The lower velocity air from the second nozzle is carried by the higher velocity air from the first nozzle, over the surface and into the enclosed space. The supply air is thus properly distributed into the enclosed space, but at a velocity below that likely to cause uncomfortable drafts. In addition, the present invention provides a stable airflow pattern in the cabin. Furthermore, since the airflow throughout the cabin is relatively uniform and of low velocity, it produces almost no audible noise.

These and other objects and advantages of the invention will be readily apparent to those skilled in the art from the attached drawings and the disclosure of the preferred embodiments that follow hereinbelow.

BRIEF DESCRIPTION OF THE DRAWINGS

FIG. 6 is a plan view, partially cutaway, showing a section of the dual jet ventilation system.

FIG. 7 is a cross-sectional view of the second embodiment of the invention taken along section lines 7—7 of FIG. 6.

DISCLOSURE OF THE PREFERRED EMBODIMENTS

Figure 1:
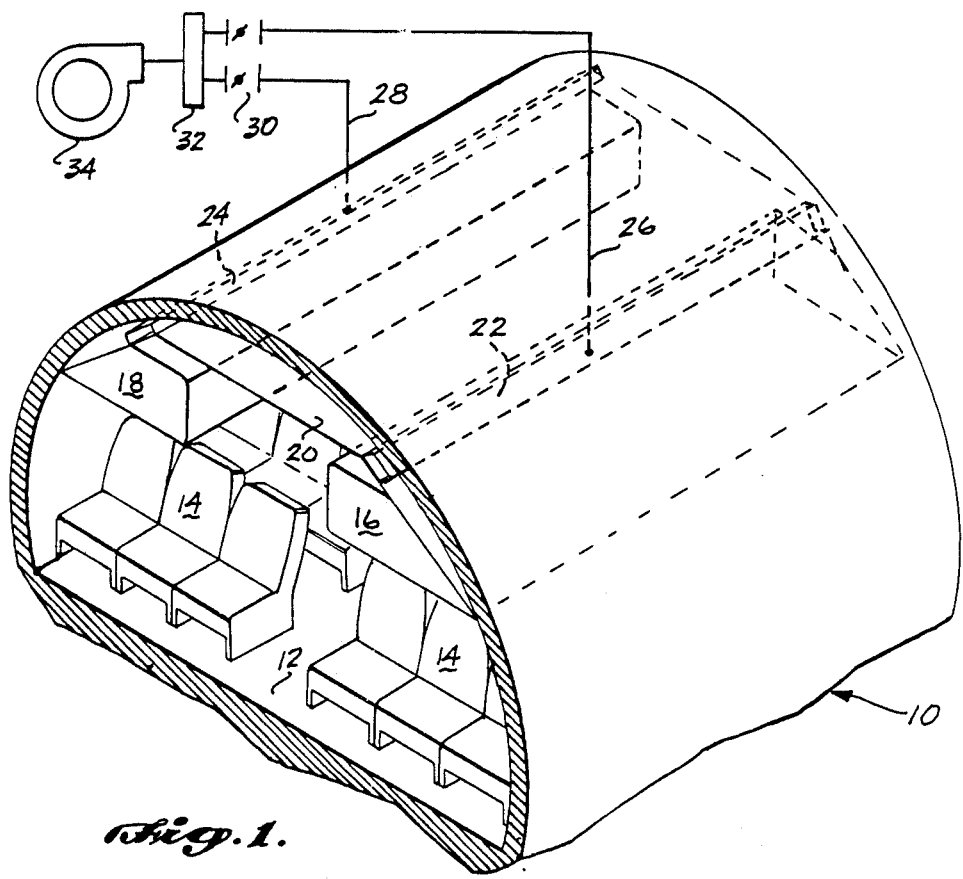
FIG. 1 is a cutaway perspective view of an aircraft cabin showing schematically the present invention installed for supplying ventilation air.

With reference to FIG. 1, a section of an aircraft fuselage generally denoted by Reference 10 is shown in conjunction with a ventilation system for delivering pressurized supply air to a cabin 12. Cabin 12 includes two passenger seating areas 14 with three abreast seating arranged on each side of a center aisle. Immediately above the passenger seating areas 14 are disposed left and right overhead storage bins 16 and 18 (wherein left and right are relative to a passenger seated in area 14). The central top portion of cabin 12 is defined by a ceiling panel 20.

Pressurized ventilation air is supplied to cabin 12 through supply ducts 22 and 24, which are disposed between overhead storage bins 16 and 18 and ceiling panel 20, and which extend parallel to the longitudinal axis of fuselage 10 along the perimeter of cabin 12. Pressurized supply air is conveyed to supply ducts 22 and 24 through supply lines 26 and 28, respectively. The proportional flow of pressurized supply air through each of these lines is determined by air balancing valves 30 which receive their input from a mixing manifold 32. Mixing manifold 32 is provided with a plurality of inputs for both recirculated return air that is drawn from cabin 12, and pressurized fresh air provided by air pack 34.

Although represented in FIG. 1 as simply a fan, air pack 34 typically includes a turbine-driven compressor for compressing the relatively low density fresh air found at higher altitudes, temperature conditioning means for heating (and cooling) the fresh air, and a filtering system. Since these components of air pack 34 have little or no importance to an understanding of the present invention, their details are not further disclosed or discussed herein.

Ideally, ventilation air supplied through air ducts 22 and 24 should circulate within cabin 12 in a generally symmetrical pattern, and should be of sufficient volumetric flow to provide the required cabin pressurization and ventilation. It is also important that the velocity of the ventilation airflow experienced by passengers in seating areas 14 not cause them to become uncomfortable because of excessive drafts.

Figure 3:
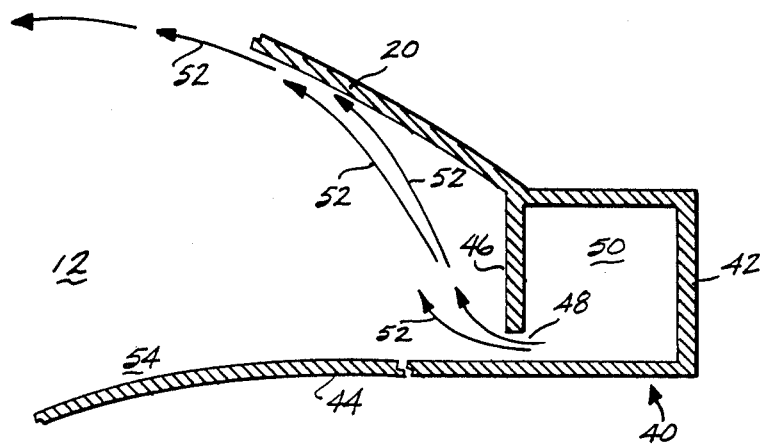
FIG. 3 is a cross-sectional view showing in elevation, a single nozzle supply duct.

With reference to FIG. 3, a first ventilation system attempting to achieve these objectives in a simplistic fashion is generally denoted by reference numeral 40. In ventilation system 40, air is provided through a rectangular supply duct 42 along the perimeter of the aircraft cabin 12 in a manner similar to that described for supply ducts 22 and 24. Immediately adjacent and below supply duct 42 is disposed the top surface 44 of a storage bin (not shown). A vertical side panel 46 of duct 42 depends toward surface 44, so that the spacing between the lower portion of side panel 46 and surface 44 defines a relatively narrow slot-like nozzle 48 which provides an opening for air to flow from the interior 50 of duct 42 into the enclosed space of cabin 12.

The operating characteristics of the ventilation system 40 primarily depend upon the volumetric flow through the interior 50 of duct 42 and the relative dimensions of nozzle 48. Assuming that the volumetric flow through supply duct 42 is constant and adequate to provide proper ventilation for passengers in cabin 12, the velocity of airflow through nozzle 48 should be sufficient so that supply air flowing from the interior 50 of duct 42 attaches itself to the top surface 44 of the overhead storage bins. If the velocity is insufficient to effect such attachment, air flowing through nozzle 48 may flow toward ceiling 20 as shown by arrows 52, instead of along surface 44. When air from duct 42 flows into the enclosed space of cabin 12 along ceiling 20, an asymmetric airflow pattern illustrated in FIG. 4 results.

Figure 4:
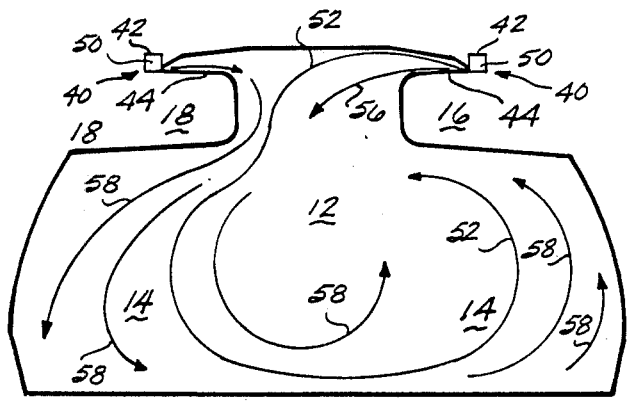
FIG. 4 is a cross-sectional view of an aircraft cabin showing an asymmetric airflow distribution pattern.

As shown in FIG. 4, the airflow from duct 42 at one side of the cabin follows the path along the ceiling indicated by arrow 52, carrying a majority of the supply air over to the opposite side of cabin 12. Although some of the air may flow in the direction of arrow 56, the majority of the air supply fails to follow surface 44 down into cabin 12. Air from duct 42 disposed on the opposite side of cabin 12 is thus forced into the path denoted by arrows 58. Not only is the flow pattern shown in FIG. 4 asymmetric, it is also unstable and can easily revert to a mirror image of that which is shown.

An apparent solution to the symmetry problem would be to increase the velocity of airflow through nozzle 48 from duct 42. This could be accomplished by reducing the separation between the lower portion of side panel 46 and the top surface 44 of the overhead storage bin. In fact, a substantially increased velocity results in the desired symmetric airflow pattern illustrated in FIG. 5. In this pattern, air flows from the interior 50 of duct 42 on each side and flows into cabin 12 in the distribution pattern generally denoted by arrows 60. This airflow pattern is both symmetric with regard to a line or vertical plane drawn through the center of cabin 12 and furthermore, is quite stable. Unfortunately, to achieve the symmetric airflow pattern of FIG. 5, the single nozzle design illustrated in FIG. 3 must produce an airflow having a velocity that is unacceptable. The velocity of the airflow is unacceptable because it causes the passengers in cabin 12 to feel discomfort due to drafts. Ideally, in the passenger seating areas 14, the maximum velocity of airflow should be less than 65 feet per minute, and the average velocity should be in the range of 15 to 50 feet per minute.

Figure 2:
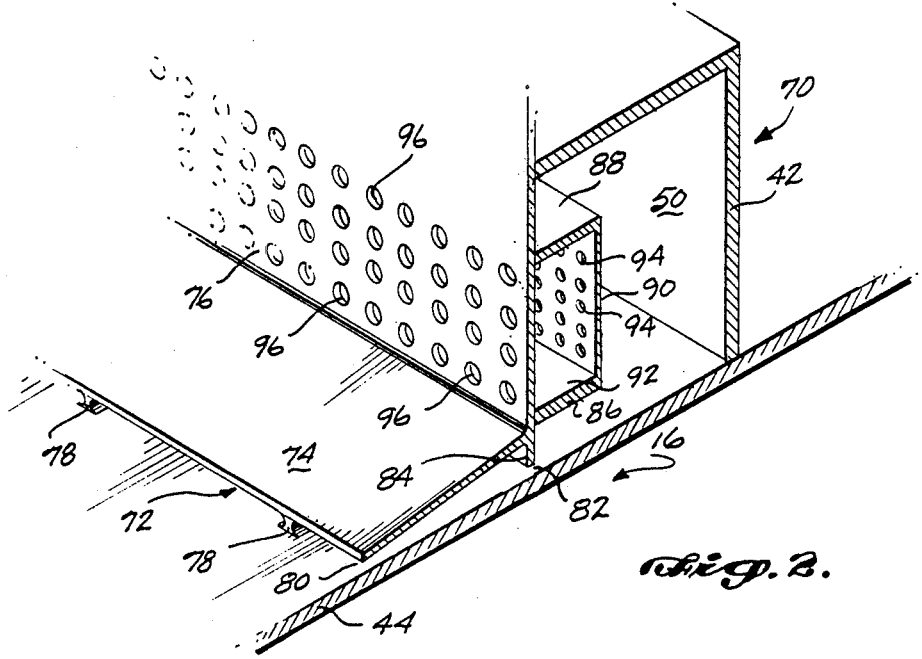
FIG. 2 is a cutaway perspective view showing a first embodiment of the present invention.

Turning now to FIG. 2, a dual nozzle ventilation system comprising a first embodiment of the present invention is generally denoted by reference numeral 70. Ventilation system 70 includes a rectangular supply air duct 42 having vertical sides, which is disposed adjacent a top surface 44 of an overhead storage bin 16. Supply air is delivered through duct 42 in sufficient volume to meet the ventilation requirements of the passengers in cabin 12. Air is delivered from the interior 50 of duct 42 through a first nozzle 72 that is defined by a flange 74. Flange 74 is attached to a diffuser plate 76 that defines one vertical side of duct 42, and extends outwardly therefrom into cabin 12. Flange 74 is angled downwardly from the point where it attaches to diffuser plate 76, and in combination with spacers 78, defines a plurality of slots comprising first nozzle 72, disposed immediately adjacent to the top surface 44 of overhead storage bin 16. The vertical width 80 of first nozzle 72 in part determines the velocity of pressurized airflow from the interior 50 of the duct 42 into the enclosed space; however, that velocity is also affected by a restriction slot 82 defined by the lower end 84 of diffuser 76 and the top surface 44 of the overhead storage bin 16. Air flowing through first nozzle 72 experiences a pressure drop as it flows through restriction slot 82, and thus, both its velocity and flow volume are controlled.

Inside duct 42, along the interior surface of diffuser plate 76, three panels 86, 88 and 90 are connected orthogonally at their edges to define, along with diffuser plate 76, a plenum 92. Pressurized supply air from the interior 50 of duct 42 flows into plenum 92 through a plurality of orifices 94 that are spaced apart in regular array on panel 90. Diffuser panel 76 likewise includes a plurality of orifices 96 that are spaced apart in regular array in fluid communication with the interior of plenum 92. The relative diameters of orifices 94 and 96 are selected so that the pressure within plenum 92 is lower and intermediate the pressure within interior 50 of supply duct 42 and the pressure within the enclosed space of cabin 12. The number and diameter of orifices 94 and 96 are also selected so that a substantially greater volume of air flows from the interior 50 of duct 42 through orifices 96 (referred to collectively as the "second nozzle") than flows through first nozzle 72. Not only is the airflow through orifices 96 greater in volume, it is also substantially lower in velocity than the airflow through first nozzle 72.

The velocity of airflow exiting first nozzle 72 as previously noted above, is determined by the size of restriction slot 82 and width 80. Restriction slot 82 can be made variable in size if the lower portion of diffuser plate 76 is slotted and is attached to the upper portion with screws (not shown) extending through the slots so that the lower portion is vertically adjustable.

Figure 5:
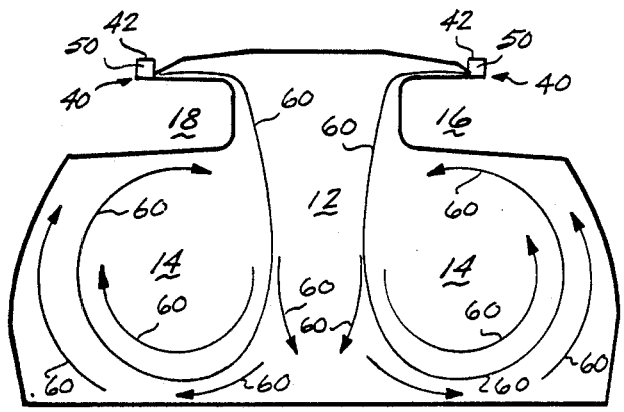
FIG. 5 is a cross-sectional view of an aircraft pattern showing a symmetrical airflow distribution pattern.

The size of restriction slot 82 and width 80 are selected so that the velocity of air exiting first nozzle 72 is sufficient to attach the airflow to the top surface 44 of the storage bin, thus insuring that the airflow follows that surface as it curves downwardly into the interior of cabin 12. Airflow attachment to a surface in this manner exhibits the well known Coanda Effect. Lower velocity air exiting orifices 96 flows outwardly therefrom into cabin 12 above flange 74, mixing with the higher velocity air exiting through first nozzle 72. The lower velocity air flows with and is carried by the higher velocity air over the top surface 44 of storage bin 16, downwardly into cabin 12 in the symmetric pattern shown in FIG. 5. Since the combined airflow from first nozzle 72 and orifices 96 has an average velocity in the passenger seating areas 14 that is within the desired range as previously defined, the stable pattern illustrated in FIG. 5 is achieved without passenger discomfort due to drafts.

With reference to FIGS. 6 and 7, a second embodiment of the present invention is generally denoted by reference numeral 100. The dual nozzle ventilation system 100 includes pressurized ventilation supply air ducts 102 that extend generally parallel to the longitudinal axis of fuselage 10, and which are disposed along the perimeter of cabin 12 above and adjacent the top surface 44 of storage bins 16 and 18, in disposition analogous to that of ducts 24 and 26 in FIG. 1. Pressurized supply air enters the interior 106 of each supply duct 102 through a plurality of supply line connector bibs 104 at spaced apart points along its length.

An angled diffuser plate 108 forms one side of the generally trapezoidal shaped supply duct 102, and includes a plurality of spaced apart relatively small orifices 110. Air flows from the interior 106 of supply duct 102 through orifices 110 at a relatively high volume and low velocity as determined by the diameter and number of such orifices.

Air also flows from interior 106 of supply duct 102 through a restriction 124, the width of which is determined by spacers 126. A plenun 128 disposed downstream of restriction 124 is defined by an "L" shaped flange 114 and an opposing "L" shaped end 116 of a bottom panel of duct 102. The outwardly extending end of flange 114 and end 116 of the bottom panel of duct 102 also define a nozzle 118, the height of which is determined by spacers 120. Nozzle 118 thus comprises a plurality of slots extending longitudinally along an adjacent upper surface 132 of door 130 that is associated with storage bin 16. The outer surface 132 of door 130 curves downwardly into the interior enclosed space of cabin 12.

The velocity and volume of airflow throgh nozzle 118 is determined by the dimensions of flow restriction path 124 and of nozzle 188. Those dimensions are selected so that air flowing from nozzle 118 attaches itself to the outer surface 132 of door 130, thereby flowing downwardly along that surface into cabin 12. The flow of pressurized supply air through orifices 110 is relatively higher in volume and lower in velocity than that through nozzle 118. The lower velocity, higher volume air flowing through orifices 110 mixes with the higher velocity, lower volume air flowing through nozzle 118, the two airstreams together flowing along the outer surface 132 of door 130 and following that surface downwardly into cabin 12.

Absent the high velocity airflow through nozzle 118, pressurized supply air flowing through orifices 110 would tend to flow along ceiling 20 in the asymmetric pattern illustrated in FIG. 4. The dual nozzle airflow system 100 corrects this problem, supplying air of sufficient volume to provide ventilation for passengers in cabin 12, while avoiding both the uncomfortable draftiness of the single nozzle design shown in FIG. 3 and the asymmetric distribution illustrated in FIG. 4. Provision of a symmetric airflow distribution at an acceptable velocity in seating areas 14 permits more efficient carbon dioxide and smoke collection to be achieved within cabin 12, a result often not possible with prior art air distribution and ventilation systems.

Although the present invention has been illustrated and described with respect to preferred embodiments and modifications thereto, other modifications will be apparent to those skilled in the art. Accordingly, it is not intended that the invention be limited by the disclosure or by such modifications, but instead, that its scope be determined entirely by reference to the claims which follow hereinbelow.

I claim:

1. Apparatus for supplying a fluid to an enclosed space along a surface extending into the space, comprising:
   (a) a pressurized fluid supply duct extending adjacent the surface, in fluid communication with a source of a fluid having a pressure in excess of that in the enclosed space and operative to convey the pressurized fluid;
   (b) nozzle means in fluid communication with the pressurized fluid supply duct and disposed adjacent the surface, for directing a flow of the pressurized fluid from said supply duct into the space with sufficient velocity that the flowing fluid attaches to the surface, following it into the space; and
   (c) diffuser means also in fluid communication with the pressurized fluid supply duct and disposed adjacent the nozzle means, for directing a flow of pressurized fluid from said supply duct into the space at a substantially lower flow velocity and a higher volumetric flow rate than the fluid flow-directed by the nozzle means, the fluid at the lower flow velocity mixing with and being carried along with the fluid at the higher flow velocity as it flows from the nozzle, and into the space along the surface.

2. The apparatus of claim 1 further comprising means for controlling the volume of fluid flow through the nozzle means relative to fluid flow through the diffuser means, the volume of flow through the nozzle means being substantially less than through the diffuser means.

3. The apparatus of claim 2 wherein the means for controlling the volume of fluid flow include a flow restriction passage disposed upstream of the nozzle means.

4. The apparatus of claim 1 wherein the pressurized fluid flowing through the nozzle means exits therefrom at a location substantially removed from that where pressurized fluid flows into the space from the diffuser means.

5. The apparatus of claim 1 wherein the diffuser means include a plenum in which fluid pressure is intermediate that of the supply duct and the enclosed space.

6. The apparatus of claim 1 wherein the diffuser means comprise a first plate having a plurality of orifices through which pressurized fluid flows into the enclosed space from the supply duct.

7. The apparatus of claim 6 wherein the diffuser means further comprise a second plate having a plurality of orifices, which is disposed upstream of the fluid flow through the first plate.

8. Ventilation apparatus for distributing pressurized air into an enclosed space comprising:
  (a) a pressurized air supply duct carrying flowing air at a pressure substantially greater than that of the enclosed space, disposed generally at a perimeter of the enclosed space and adjacent a surface associated with the space that extends inwardly of the space, away from the duct;
  (b) a flange extending adjacent the surface, defining a first nozzle with an outlet in direct fluid communication with the supply duct, through which the pressurized air flows into the space;
  (c) means for restricting the flow of the pressurized air from the supply duct through the first nozzle outlet while maintaining a flow velocity sufficient so that the airflow exiting the outlet attaches to the adjacent surface, following it inwardly into the space;
  (d) a second nozzle, also in direct fluid communication with the supply duct and having a plurality of outlets disposed adjacent the flange, through which the pressurized air flows into the space at a volumetric flow that is substantially greater than that through the first nozzle;
  (e) means for restricting the flow of the pressurized air from the supply duct through the second nozzle to a velocity substantially less than the velocity of the pressurized air exiting the first nozzle outlet, the air exiting the second nozzle mixing with the higher velocity air exiting the first nozzle and being carried by it over the surface and into the space.

9. The ventilation apparatus of claim 8 wherein the enclosed space is an aircraft cabin and the inwardly extending surface associated with the space is an outer surface of an overhead storage bin that curves downwardly toward a passenger seating area.

10. The ventilation apparatus of claim 8 wherein a side of the first nozzle comprises a surface adjacent the flange and wherein the outlet of the first nozzle comprises one or more slots.

11. The ventilation apparatus of claim 8 wherein the outlets of the second nozzle are disposed between the inwardly extending surface associated with the enclosed space and a ceiling of the enclosed space.

12. The ventilation apparatus of claim 8 wherein the means for restricting the flow of the pressurized air from the supply duct through the second nozzle include a plenum disposed upstream of the air flowing through the second nozzle.

13. The ventilation apparatus of claim 8 wherein the means for restricting airflow through the second nozzle include a diffuser having a plurality of orifices interposed between the supply duct and the enclosed space.

14. The ventilation apparatus of claim 8 wherein the means for restricting airflow through the first nozzle is adjustable so as to vary the proportion of airflow through the first nozzle relative to the second nozzle.

15. Ventilation apparatus for distributing pressurized air into an enclosed space, comprising:
  (a) a supply duct adapted to convey the pressurized air along a path extending adjacent the space;
  (b) a nozzle in fluid communication with the supply duct, extending linearly along at least a portion of the path and having an opening disposed adjacent a colinear surface that curves away from the nozzle into the enclosed space;
  (c) a first flow restrictor disposed in an airflow path between the supply duct and the nozzle opening and sized so that the pressurized air flowing out of the nozzle opening achieves sufficient velocity to attach to the adjacent surface, following it into the enclosed surface; and
  (d) a diffuser, in fluid communication with the supply duct and extending adjacent a side of it, the diffuser including a second flow restrictor disposed in an airflow path between the supply duct and the enclosed space, the second flow restrictor comprising a diffuser panel having a plurality of outlets for the air flowing from the supply duct through the diffuser, the air flowing through the diffuser panel outlets having a substantially lower velocity and a higher volumetric flow rate than the air flowing from the nozzle opening, the higher velocity air flowing from the nozzle along the surface and into the space tending to mix with and carry into the space the lower velocity air.

16. The ventilation apparatus of claim 15 wherein the supply duct is disposed along an area where the colinear surface and a ceiling panel of the enclosed space converge toward each other and wherein the presence and proximity of the higher velocity airflow from the nozzle opening prevents the lower velocity airflow from the diffuser panel from flowing into the space along the ceiling panel.

17. The ventilation apparatus of claim 15 wherein the mixed higher and lower velocity airflow is uniformly distributed to a substantial portion of the enclosed space in a stable airflow pattern.

18. The ventilation apparatus of claim 15 wherein the enclosed space is a cabin of an aircraft and the colinear surface comprises an outer surface of a storage bin.

19. The ventilation apparatus of claim 18 wherein the outer surface of the storage bin curves downwardly toward a passenger seating area disposed below the storage bin and wherein the mixed higher and lower velocity airflow follows the surface downwardly to be substantially uniformly distributed throughout the seating area.

* * * * *